Oct. 10, 1933.  F. T. COURT  1,929,773
CONTROL MECHANISM FOR TRACTOR DRIVEN IMPLEMENTS
Filed Jan. 10, 1927  3 Sheets-Sheet 1
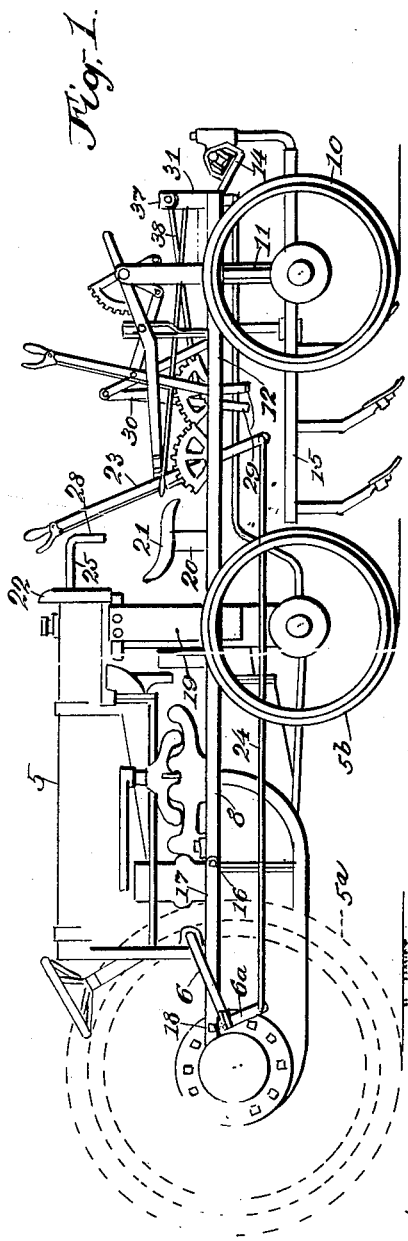
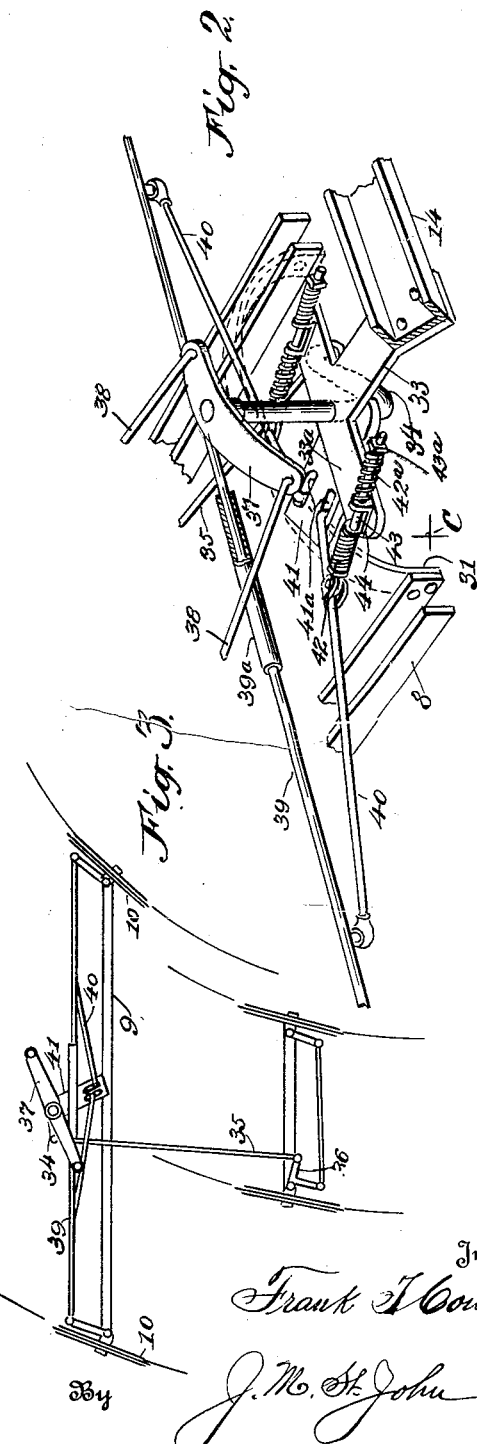
Inventor
Frank T. Court
By J. M. St. John
Attorney

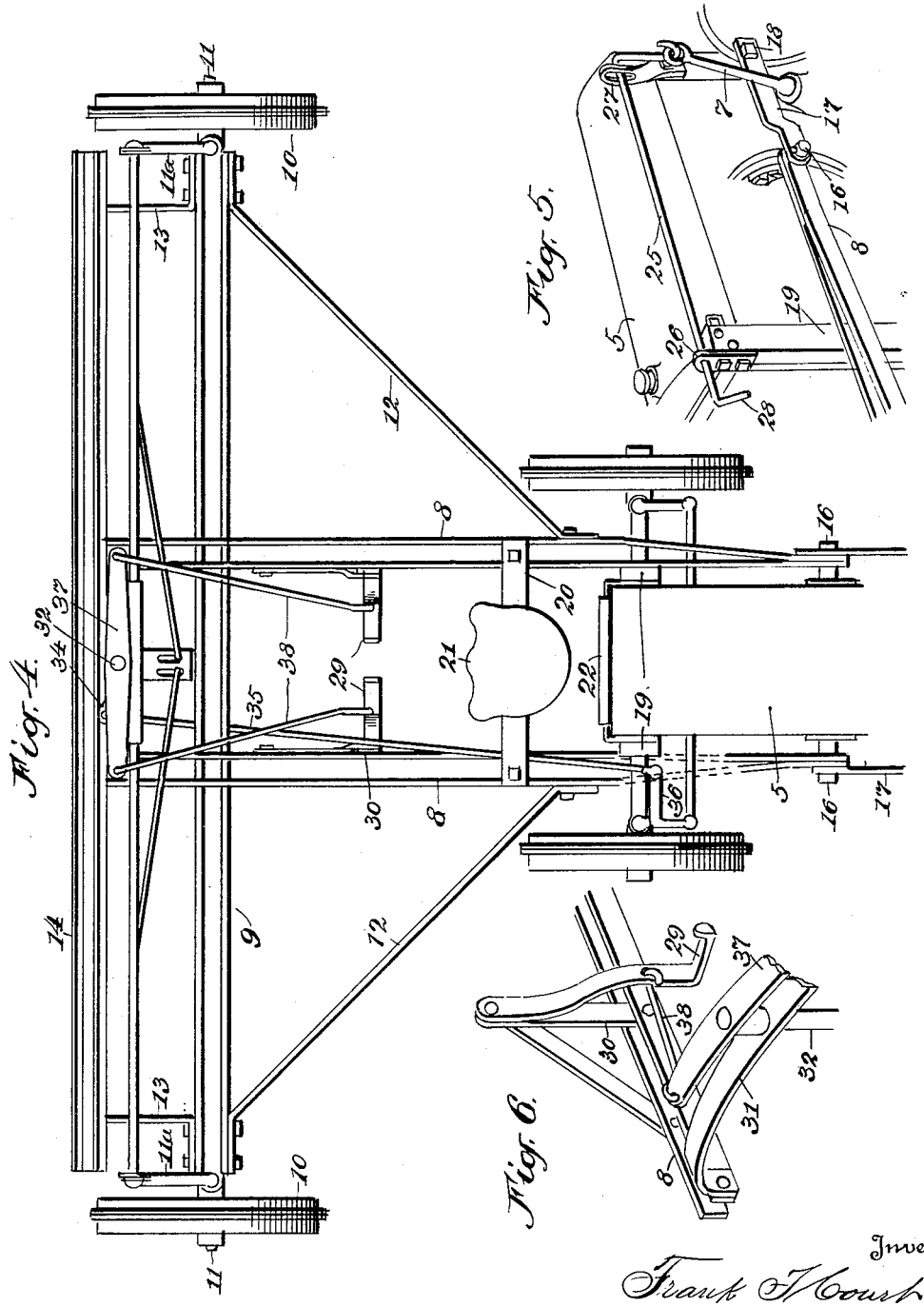

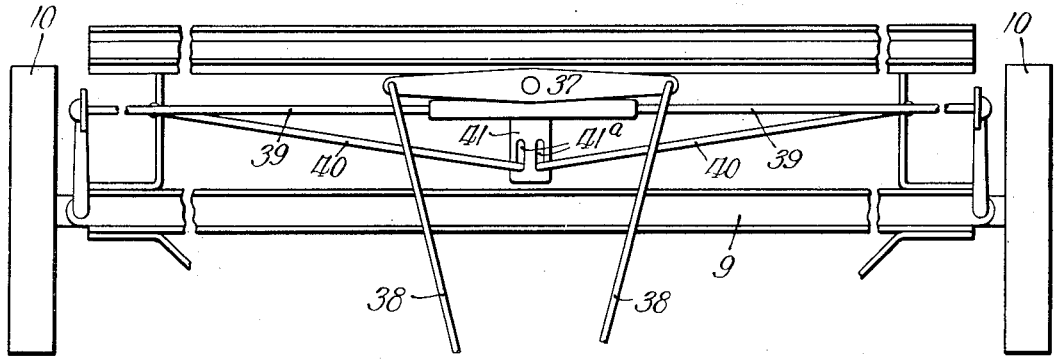
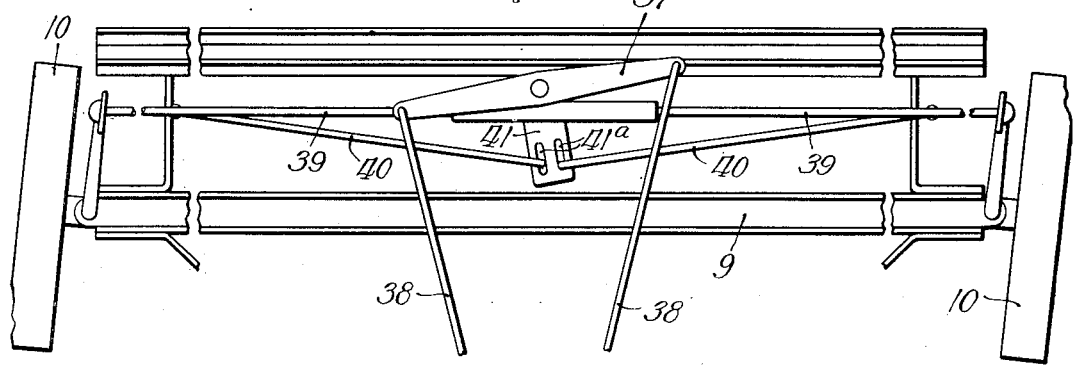
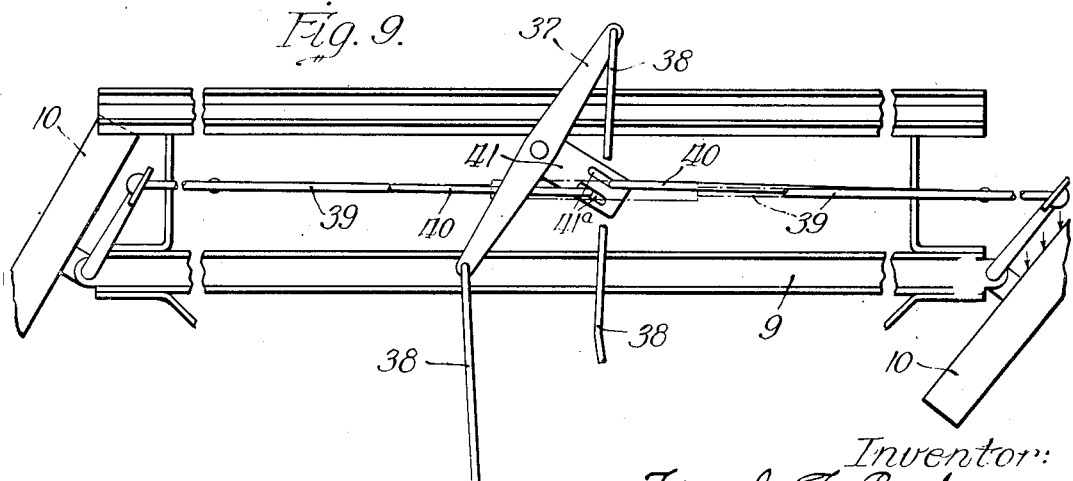

Patented Oct. 10, 1933　　　　　　　　　　　　　　　　　　　　　　　　　　　1,929,773

UNITED STATES PATENT OFFICE 1,929,773

CONTROL MECHANISM FOR TRACTOR
DRIVEN IMPLEMENTS

Frank T. Court, Moline, Ill., assignor to Court
Tractor Equipment Company, Independence,
Iowa, a corporation of Iowa Application January 10, 1927. Serial No. 160,188

41 Claims. (Cl. 280—91)

This invention relates to tractor propelled machines comprising a tractor having steering means at the front and propelling means at the rear, and an attachment in the form of a frame supported on dirigible wheels, said frame being located in advance of the tractor and connected therewith to be pushed thereby, the connections being such as to permit the frame to move vertically with respect to the tractor. So far as my present invention is concerned, it is immaterial whether the pushed frame carries soil treating tools, excavating or scraping tools, harvesting tools, or is of general utility for carrying any useful load, as such invention has to do particularly with the provision of improved steering means whereby the operator may easily and positively guide the combined machine, either straight away or in turning, the course of the steering wheels being differentially controlled to properly guide the machine.

As is well understood, in a self-propelled vehicle it is desirable that the usual steering wheels be capable of differential movement with respect to each other in making a turn, so that the inner wheel may turn to a more acute angle than the outer wheel, to permit both wheels to follow arcs having a common center, or approximately so, and one of the objects of my invention is to provide for differentially steering all the steering wheels of a combined machine of the character above referred to, whether the steering wheels of the pushed frame, or attachment, be located normally in line with the steering wheel or wheels of the tractor, or be differently spaced with respect thereto. In the case of various attachments, as for example cultivator attachments, it is desirable to space the steering wheels of such attachment farther apart than the steering wheels of the tractor, and my improved construction is designed to provide the desired differential steering regardless of such variations in spacing.

Another object of my invention is to provide steering control mechanism by which the inside steering wheel of the attachment frame will be positively held at the desired angle in executing a turn, while the corresponding outside wheel will be yieldingly controlled but will, nevertheless, be held approximately in the proper angular relation to the inside wheel to cause it to follow the appropriate arc. Preferably, the outside wheel is held under spring tension at a greater degree of angle than its normal differential movement, the purpose of which is to throw more of the traction on the outside wheel so that it will aid in changing the course of the vehicle. This is especially advantageous in traveling over loose soil.

Other objects and advantages of my invention will appear from the following description thereof in connection with the drawings, in which I have chosen to exemplify the invention as embodied in a tractor pushed cultivator such as that shown and described in my copending application for patent filed September 28, 1926, Serial No. 137,935. Although this application is concerned only with the steering mechanism, for the sake of clearness certain other parts of the particular tractor and cultivator attachment shown will be described.

In the accompanying drawings, forming a part of this specification,

Figure 1 is a side elevation of a machine embodying the invention;

Figure 2 shows in perspective details of apparatus for guiding the wheels of the implement and the front wheels of the tractor concurrently and differentially;

Figure 3 illustrates the same mechanism in a conventional plan view;

Figure 4 is a plan view of the machine shown in Figure 1, but with many of the cultivator details omitted;

Figure 5 is a fragmentary view in perspective illustrating the implement frame connection with the tractor, and means for shifting the tractor gears;

Figure 6 illustrates the foot-lever mechanism for guiding the tractor and implement; and Figures 7, 8 and 9 are fragmentary diagrammatic views illustrating the operation of my improved steering means.

In the drawings, the numeral 5 denotes a well-known farm tractor shown conventionally. This tractor, which is supported at the rear or propelling wheels 5a and at the front on steering wheels 5b of the well-known automobile type, has its own clutch-lever 6, normally operated by the foot, and at the other side its gearshift lever 7, which has the usual compound movement in shifting gears. To give a better leverage to the clutch-lever in operating it from in front of the tractor, it is provided with a depending bracket 6a. The mechanism for operating these tractor controls will be described presently.

In the illustrated construction, the tractor is provided with a three-row cultivator attachment which is arranged in advance of the tractor and is supported at the front on dirigible wheels. The cultivator frame comprises parallel side bars 8 spaced apart slightly more than the width of the tractor and secured at their forward ends to a long cross or transversely disposed bar 9, the end portions of which are braced to the rearward portions of the side bars 8 by diagonal braces 12 to give rigidity to the frame structure. The transverse bar 9 serves as the main support for a pair of dirigible wheels 10 carried on spindles 11 and provided with forwardly extending crank arms 11a. The spindles 11 are journaled in suitable vertically disposed bearings mounted at the end portions of the transverse bar 9. To said transverse bar is attached, as by forwardly projecting brackets 13, a channel bar 14, which serves as the front end support for a series of cultivating rigs or gangs 15, as shown in Figure 1. It will be noted that in the construction described, the steering wheels 10 of the attachment are spaced much further apart than the steering wheels 5b of the tractor, as shown in Figure 4.

The implement frame above described is coupled to the tractor for vertical movement with respect thereto by its parallel bars engaging studs 16, which, as brackets, are bolted to the tractor crank-case by one or more of the tractor's own bolts. Rearwardly extending straps 17 connect with the studs and are bolted at 18 by other of the tractor bolts, this providing adequate resistance to the thrust of the implement. Between the side-bars and the tractor radiator are interposed wearing-blocks 19, which permit the frame to play up and down, but prevent lateral movement.

In the illustrated construction, the attachment frame carries a cross-bar 20 in front of the tractor and on it is mounted the driver's seat 21. A suitable back 22 for this seat is mounted in front of the radiator. This should be of wood, or the like, so as to shield the operator from the heat of the radiator when he leans back.

A hand-lever 23, mounted on the main frame, connects by a rod 24 with the clutch-lever bracket 6a above mentioned. By this means the clutch is easily released.

A rockable and slidable cranked lever 25, carried in bearings 26 and 27, connects with the upper end of the tractor gear-shift lever 7. By means of a hand-lever 28, within easy reach of the operator as he sits, the gear is shifted as desired.

In the embodiment of my invention illustrated, the steering wheels of the tractor and of the attachment are steered concurrently and differentially by the operation of a pair of foot-levers 29 hung from standards 30 secured to the main frame. At the front end of the frame is a bridge 31, which serves as the upper bearing for a vertical rock-shaft 32. The lower end of this shaft is carried by a bearing 33 secured to the channel-bar 14. The shaft 32 carries a crank 34, and this connects by a rod 35 with the operating arm 36 of the tractor steering-gear. To the upper end of the rock-shaft 32 is attached a double lever or cross-head 37, the opposite ends of which are connected by link-rods 38 with the foot-levers above mentioned. The dirigible wheels 5b of the tractor may thus be guided by operating the foot-levers to rock the rock-shaft 32 and thereby swing its crank 34 back or forth to actuate the arm 36 in one direction or the other. The same foot-levers are employed to steer the dirigible wheels 10 of the attachment, but through the medium of special steering mechanism.

Referring to Figure 3, the steering of the apparatus as a whole is illustrated diagrammatically. It will be noted that in turning all of the wheels move in different arcs, the common center of which is placed at C in Figure 2. It will be further noted that no two of the wheels then stand at the same angle to the parallel transverse members of the tractor and attachment on which they are respectively mounted. This is especially true of the attachment wheels 10, the inside wheel being there shown as at a much sharper angle to the transverse member 9 than the other. This ideal and proper position in turning is made possible by apparatus now to be described.

The forwardly extending cranks 11a of the attachment wheel spindles 11 are connected by a tie-rod 39. This is necessarily an extensible or slip-rod, one of its members sliding in a sleeve 39a carried by the other member, as shown in Figure 2. Connecting rods 40 are pivotally connected at their outer ends respectively, with the members of the tie rod 39 at opposite sides of the sleeve 39a, and their inner ends engage a bell-crank arm 41 secured to the rock-shaft 32 to be swung transversely by the rocking thereof. The arm 41 is provided with two slots 41a that are substantially radially disposed with respect to said rock shaft and the connecting rods have turned ends that play in and out in said slots respectively a limited distance radially with respect to the rock shaft. This slippage of the connecting rods compensates for the longer and shorter arcs of movement of the steering arms, and so not only permits the wheels to take the proper positions, as shown in Figure 3, but positively forces them to take such positions. To give positive effect to the movement, slip rods 43 are slidably mounted at opposite sides of the rock-shaft 32 on the lateral extensions 33a of the bearing plate 33, upstanding U-shaped guides 44 being pivotally mounted on said extensions and having perforations through which said slip rods slide, as best shown in Figure 2. The rear ends of the slip rods 43 are pivotally connected with the connecting rods 40, respectively, between their ends, and said slip rods extend forward through the guides 44. Mounted on each slip rod, between its guide 44 and the connecting rod 40 with which said rod is connected, is a coiled spring 42, and a similar spring 42a is mounted on each slip rod 43 between its guide 44 and a nut 43a screwed upon the forward end of said rod, as shown in Figure 2. The two springs 42, 42a on each slid rod therefore cooperate to hold the rod on which they are mounted normally in a neutral position. Obviously, when either slip rod is moved longitudinally through its guide 44 in one direction or the other, one or the other of its springs 42, 42a will be put under greater tension and the tension on the other spring will be reduced. Preferably, adjustments of these parts are such that when the steering wheels are directed straight ahead the inner ends of the connecting rods 40 will both be at the rearward ends of their respective slots 41a, as shown in Figure 4, at which time the arm 41 will extend straight back from the rock shaft 32 in parallel relation to the wheels. In other words, in this situation the inner ends of the connecting rods 40 will be at their greatest distance from the rock shaft 32, and as in the embodiment of my invention illustrated the crank arm 41 extends rearwardly from said rock shaft the inner ends of the connecting rods are at the rearward ends of the slots 41a. If the crank arm 41 were reversed so as to extend forward from the rock shaft 32 the inner ends of the connecting rods 40 should normally lie at the forward ends of the slots 41a, as will be understood.

If with the parts in their normal position the operator desires to steer to the right, as indicated in Figure 3, he pushes forward on the right hand foot lever 29 to rock the rock shaft 32 in a counterclockwise direction, thereby swinging the crank arm 41 to the right, as shown in said figure. This swings the crank 34 rearwardly and moves the rod 35 rearwardly, thereby rocking the operating arm 36 of the tractor steering gear in a clockwise direction and turning the tractor steering wheels to the right. The swinging of the arm 41 in the direction described thrusts the connecting rod 40 at the right hand side of the attachment toward the right, thereby moving the tie rod 39 connected with it in the same direction, which turns the right hand steering wheel of the attachment toward the right. At the same time this swinging of the arm 41 pulls on the left hand connecting rod 40, which pull is transmitted to the left hand tie rod 39, and accordingly the left hand steering wheel of the attachment is also turned to the right.

The movement of the two attachment steering wheels, however, is not uniform, but is differential in character, as best shown, somewhat diagrammatically, in Figures 7, 8 and 9. For example, when the machine is steered to the right, the right hand wheel is turned to a much sharper angular position with reference to the transverse bar 9 on which it is mounted than the left hand wheel, as also clearly shown in Figure 3. This differential movement results because the inner end of the right hand connecting rod 40 is held in the outer or rearward end of its slot 41a, principally by the earth pressure or resistance, indicated in Figure 9 by the small arrows, acting against the inside of the right hand wheel, which is mounted on a stub axle journaled on a vertical pivot positioned inwardly of the plane of the wheel, thus holding the inside wheel against movement in the direction in which the earth pressure tends to move it. Also, as best shown in Figure 2, the rod 40 is held in the outer end of its slot 41a by its spring 42, the tension of which is increased by the lateral swinging of the arm 41, since such lateral swinging moves the slip rod 43 forward through its guide 44 and thereby increases the tension of its spring 42. Obviously, the distance that the tie rod 39 will be moved by swinging the arm 41 through a given arc depends upon the distance between the rock shaft 32 and the point at which the connecting rod 40 is connected with the arm 41. The greater this distance the farther the tie rod 39 will be moved. Consequently, by holding the inner end of the right hand connecting rod 40 at the outer end of its slot 41a, i. e., at its greatest distance from the rock shaft 32, the maximum angular movement will be imparted to the right hand attachment steering wheel. In the case of the left hand attachment steering wheel, the connecting rod 40 that controls its movement is not held at the outer end of its slot 41a, but is permitted to move in said slot toward the rock shaft 32, as illustrated in Figures 3, 8 and 9 and consequently the angular movement of the latter wheel is not so great. This results from the fact that when the arm 41 is swung to the right in the manner illustrated, the left hand slip rod 43 is caused to move rearward through its guide 44, thereby increasing the tension of its spring 42a and relaxing the tension of the spring 42, as best shown in Figure 2.

The inner end of said connecting rod 40 therefore moves forward in its slot 41a, or toward the rock shaft 32. It does not, however, move to the forward end of said slot, since such movement is resisted by its spring 42a, as best shown in Figure 2, which cooperates with the associated spring 42a to stop it in an intermediate position in said slot and hold it yieldingly in such position, as illustrated in Figures 8 and 9. It is desirable that the two pairs of springs be so adjusted as to give the attachment steering wheel at the inside of the turn the full angular movement necessary to cause it to travel in an arc about the common center C, whereas the attachment steering wheel at the outside of the turn is given a differential angular movement somewhat greater than that necessary to cause it to travel in an arc about such common center, this result being obtained by causing the inner end of its connecting rod 40 to move the appropriate distance from the outer end of its slot, or toward the rock shaft 32. The advantage of so doing is that the greater angularity of the outside wheel throws more of the traction on that wheel, especially in loose soil, and, therefore, aids in the steering operation by relieving the inside wheel of part of its duty of changing the course of the machine.

Obviously the differential action above described will occur when the steering wheels are turned in either direction, the wheels at the inside of the turn being turned to a greater degree of angularity than those at the outside of the turn. In the drawings I have shown the slots 41a as being substantially radial with respect to the rock shaft 32, but that is not essential.

While I have described above the preferred structure, it will be understood that my invention is not to be limited to the specific means shown and described but that, in fact, widely different means may be employed in the practice of the broader aspects of my invention, as defined in the appended claims.

What I claim, therefore, and desire to secure by Letters Patent is:

1. The combination with a vehicle including dirigible wheels, of a frame connected with the vehicle and having dirigible wheels and steering arms therefor, and a steering connection between the dirigible wheels of the vehicle and said steering arms comprising a member operatively connected with the vehicle dirigible wheels of the vehicle to be actuated by the steering thereof and separate differentially movable connections between said member and the steering arms of the dirigible wheels of the frame.

2. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising relatively shiftable members controlled by the steering of the tractor to positively hold the inside wheel against turning in response to ground resistance and for simultaneously yieldingly holding the outside wheel in turning position.

3. The combination with a tractor supported on front steering means, of a frame disposed in front of the tractor and connected therewith for vertical movement relative thereto, dirigible wheels at opposite sides of said frame for supporting the same, and steering devices for imparting a differential shift to said dirigible wheels, said steering devices comprising relatively shiftable members controlled by the steering of the tractor to positively hold the inside wheel against turning in response to ground resistance, and for simultaneously yieldingly holding the outside wheel in turning position.

4. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising relatively shiftable members controlled by the steering of the tractor to move the inside wheel to a position of greater angularity to its straight ahead position than the outside wheel, and to positively hold the inside wheel against turning in response to ground resistance while yieldingly holding the outside wheel in its angular position.

5. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising relatively shiftable members controlled by the steering of the tractor to move the inside wheel angularly to travel in an arc substantially concentric with the turning center, and for simultaneously moving the outside wheel to a position of less angularity than that of the inside wheel but of greater angularity than that necessary to cause it to travel in a concentric arc.

6. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising spring controlled relatively movable members for moving the inside wheel angularly to travel in an arc substantially concentric with the turning center, and for simultaneously moving the outside wheel to a position of less angularity than that of the inside wheel but of greater angularity than that necessary to cause it to travel in a concentric arc.

7. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising a member mounted on said frame to swing laterally, and differentially acting means connecting said member with said dirigible wheels and actuated by lateral swinging of said member to impart a differential shift to said wheels, said connecting means comprising connections shiftable relatively to said swinging member by the swinging thereof.

8. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising a member mounted on said frame to swing laterally, differentially acting means connecting said member with said dirigible wheels and actuated by lateral swinging of said member to impart a differential shift to said wheels, said connecting means comprising connections shiftable relatively to said swinging member by the swinging thereof, and means connecting said member with the tractor steering means for actuating the same simultaneously with the steering of said dirigible wheels.

9. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising a member pivotally mounted on said frame to swing laterally, said member having slots disposed substantially radially with respect to the axis of said member, means connected with said dirigible wheels and traveling in said slots respectively, for steering said wheels, and means for controlling the position of said rods in said slots to impart a differential shift to said wheels by lateral swinging of said member.

10. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising a member pivotally mounted on said frame to swing laterally, said member having slots disposed substantially radially with respect to the axis of said member, means connected with said dirigible wheels and traveling in said slots respectively for imparting a differential shift to said wheels by lateral swinging of said member, and springs for normally holding the connecting means of the inside wheel at the outer end of its slot and for yieldingly holding the connecting means of the outside wheel in an intermediate position in its slot.

11. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising a member mounted on said frame to swing laterally about an axle support, connecting rods connecting said member with said dirigible wheels respectively, and actuated by lateral swinging of said member to impart a differential shift to said wheels, said rods being movable toward and from the axis of said member, and a pair of oppositely acting springs mounted on the frame and operatively connected with each of said rods for controlling the position thereof with respect to said member.

12. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising a member mounted on said frame to swing laterally, connecting rods connecting said member with said dirigible wheels respectively and actuated by lateral swinging of said member to impart a differential shift to said wheels, an endwise movable slip rod connected with each of said connecting rods and having a bearing on said frame, and a pair of oppositely acting springs mounted on each slip rod for controlling the position of said connecting rods with respect to said member.

13. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising a member pivotally mounted on said frame to swing laterally, said member having slots disposed substantially radially with respect to the axis of said member, connecting rods connected with said dirigible wheels respectively and traveling in said slots respectively, for imparting a differential shift to said wheels by lateral swinging of said member, and a pair of oppositely acting springs mounted on the frame and operatively connected with each of said connecting rods for controlling the movement thereof in said slots.

14. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising a member pivotally mounted on said frame to swing laterally, said member having slots disposed substantially radially with respect to the axis of said member, connecting rods connected with said dirigible wheels respectively and traveling in said slots respectively, for imparting a differential shift to said wheels by lateral swinging of said member, a slip rod connected with each of said connecting rods and having a bearing on the frame, and oppositely acting springs mounted on each of said slip rods for controlling the position of said connecting rods in said slots.

15. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising a member pivotally mounted on said frame to swing laterally, an extensible tie rod connected with said dirigible wheels, connecting rods connecting the opposite end portions of said tie rod with said member, and means controlled by lateral swinging of said member to govern the position of said rods with respect to said member to impart a differential shift to said wheels.

16. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising a member pivotally mounted on said frame to swing laterally, said member having slots disposed substantially radially with respect to the axis of said member, an extensible tie rod connected with said dirigible wheels, connecting rods connected with the opposite end portions of said tie rod and traveling in said slots respectively, for imparting a differential shift to said wheels by lateral swinging of said member, and pairs of oppositely acting springs mounted on the frame for controlling the position of said connecting rods in said slots.

17. The combination with a tractor having front steering means, of a frame comprising a transverse member disposed in front of the tractor, dirigible wheels connected with the end portions of said transverse member, each of said dirigible wheels having a steering spindle and an arm connected therewith, push bars connecting said transverse member with the tractor, and a steering connection between the tractor steering means and said dirigible wheels comprising a controlling member connected with said steering means, and a connection between said controlling member and each of said arms, said connections being differentially movable with respect to said controlling member to impart a differential shift to said steering means and said dirigible wheels.

18. The combination with a tractor having front steering means, of a frame comprising a transverse member disposed in front of the tractor, dirigible wheels connected with the end portions of said transverse member, each of said dirigible wheels having a steering spindle and an arm connected therewith, push bars connecting said transverse member with the tractor to swing vertically with respect thereto, and a steering connection between the tractor steering means and said dirigible wheels comprising a controlling member connected with said steering means, and a connection between said controlling member and each of said arms, said connections being pivotally connected with said arms and differentially movable with respect to that controlling member to impart a different shift to said steering means and said dirigible wheels.

19. The combination with a tractor supported on front steering means, of a frame disposed in advance of the tractor and connected therewith to swing vertically, dirigible wheels at opposite sides of said frame for supporting the same and each having a steering arm, and steering devices for imparting a differential shift to said dirigible wheels, said steering devices comprising a member mounted on said frame to swing laterally, actuating connections between said member and said arms for steering said dirigible wheels differentially by lateral swinging of said member, said connections being shiftable relative to said member, and means operating to control the position of the actuating connections with respect to said member to steer said wheels differentially.

20. The combination with a tractor supported on front steering means, of a frame disposed in advance of the tractor and connected therewith, dirigible wheels at opposite sides of said frame for supporting the same and each having a steering arm, and steering devices for imparting a differential shift to said dirigible wheels, said steering devices comprising a member mounted on said frame to swing laterally, actuating connections between said member and said arms for steering said dirigible wheels differentially by lateral swinging of said member, said connections being shiftable relative to said member, and spring actuated means operating to control the position of the actuating connections with respect to said member to steer said wheels differentially.

21. The combination with a tractor supported on front steering means, of a frame disposed in advance of the tractor and connected therewith, dirigible wheels at opposite sides of said frame for supporting the same, and steering devices for imparting a differential shift to said dirigible wheels, said steering devices comprising separate shiftable connecting rods, one connected with each of said wheels, an operating member connected with said front steering means and adapted to be actuated to steer said dirigible wheels, the inner end of each of said rods being movably connected with said operating member, and means controlled by actuation of said operating member for shifting the position of said rods with respect to said member to steer said wheels differentially.

22. The combination with a tractor supported on front steering means, of a frame disposed in advance of the tractor and connected therewith, dirigible wheels at opposite sides of said frame for supporting the same, and steering devices for imparting a differential shift to said dirigible wheels, said steering devices comprising separate shiftable connecting rods, one connected with each of said wheels, an operating member connected with said front steering means and adapted to be actuated to steer said dirigible wheels, the inner end of each of said rods being movably connected with said operating member, and spring actuated means controlled by actuation of said operating member for shifting the position of said rods with respect to said member to steer said wheels differentially.

23. The combination with a vehicle including steering means, of a frame having dirigible wheels, a member movably mounted on the frame, means connecting said member with said steering means to be actuated therewith, connections between said member and each of said dirigible wheels, said connections being pivoted to said member, and means for shifting the pivots of said connections relative to said member to secure differential steering.

24. The combination with a vehicle including steering means, of a frame having dirigible wheels, a member movably mounted on the frame, means connecting said member with said steering means to be actuated therewith, links connecting said dirigible wheels with said member, said links being pivotally connected to said member, and means for shifting the pivots of said links with respect to said member to secure differential movement of the dirigible wheels.

25. The combination with a vehicle including steering means of a frame having dirigible wheels, a member movably mounted on the frame, means connecting said member with said steering means to be actuated therewith, connections between said member and each of said dirigible wheels and having a shiftable connection with said member, and means for imparting a difference in rate of movement, relative to said member, of the connection associated with one of said dirigible wheels and occasioned by movement of said member with respect to the rate of the corresponding movement of the connection associated with the other dirigible wheel.

26. The combination with a vehicle including steering means, of a frame having dirigible wheels and steering arms therefor, a member movably mounted on the frame, means connecting said member with said steering means to be actuated therewith, connections between said member and each of said steering arms, and means controlled in response to the extent of movement of said movable member for imparting a difference in rate of movement, relative to said member, of the connection associated with one of said steering arms and occasioned by movement of said member with respect to the rate of the corresponding movement of the connection associated with the other steering arm.

27. The combination with a vehicle including steering means, of a frame having dirigible wheels, a member movably mounted on the frame, means connecting said member with said steering means to be actuated therewith, connections between said member and each of said dirigible wheels, said connections being pivoted to said member, and means controlled in response to the extent of movement of said movable member for shifting the pivots of said connections relative to said member to secure differential steering.

28. The combination with a vehicle including steering means, of a frame having dirigible wheels, a member movably mounted on the frame, means connecting said member with said steering means to be actuated therewith, links connecting said dirigible wheels with said member, and means for changing the position of the point of connection of said links with said member relative thereto as the latter is moved.

29. The combination with a vehicle including steering means, of a frame having dirigible wheels, a member pivotally mounted on the frame, means connecting said member with said steering means to be actuated therewith, links pivoted to said member and connecting said member with each of the dirigible wheels, and means for varying the distance between the pivot axis of said member and the pivot axes of said links.

30. The combination with a vehicle having steering means of an attachment connected therewith and comprising a frame, dirigible steering means supporting said frame at spaced points thereon, a control member pivoted on said frame for movement about a vertical axis and operatively connected with the steering means of said vehicle to be actuated concomitantly therewith, a connection between each of said dirigible steering means and said member, and means comprising a pivoted member for each connection for changing the position thereof relative to said member for imparting a differential movement to said dirigible steering means.

31. The combination with a vehicle having steering means of an attachment connected therewith and comprising a frame, dirigible steering means supporting said frame at spaced points thereon, a control member having slot means and pivoted on said frame for movement about a vertical axis and operatively connected with the steering means of said vehicle to be actuated concomitantly therewith, a connection between each of said dirigible steering means and said slot means of the member, and means comprising a pivoted member for each connection for changing the position thereof relative to said slot means for imparting a differential movement to said dirigible steering means.

32. The combination with a vehicle having steering means of an attachment connected therewith and comprising a frame, dirigible steering means supporting said frame at spaced points thereon, a control member having a pair of slots and pivoted on said frame for movement about a vertical axis and operatively connected with the steering means of said vehicle to be actuated concomitantly therewith, a connection between each of said dirigibile steering means and said member, the inner portions of said connections being slidable in said slots, and pivoted means for said connections for shifting their position in the slots for imparting a differential movement to said dirigible steering means.

33. The combination with a vehicle having steering means of an attachment connected therewith and comprising a frame, dirigible steering means supporting the frame at spaced points thereon, a pair of connections associated at their outer ends with each of said dirigible steering means, and means associated with the inner ends of said connections for shifting said dirigible steering means, said shifting means being operatively connected with the steering means of said vehicle to be actuated concomitantly therewith and including separate means acting about a pair of spaced pivots for imparting a differential movement to said dirigible steering means.

34. The combination with a vehicle having steering means of an attachment connected therewith and comprising a frame, dirigible steering means supporting the frame at spaced points thereon, connections associated at their outer ends with each of said dirigible steering means, means associated with the inner ends of said connections for shifting said dirigible steering means, means operatively connecting said shifting means with the steering means of said vehicle to be actuated concomitantly therewith, and including means carried by and acting about a pair of spaced pivots fixed with respect to said shifting means for imparting a differential movement through said connections to said dirigible steering means.

35. The combination with a vehicle having steering means of an attachment connected therewith and comprising a frame, dirigible steering means supporting the frame at spaced points thereon, connections associated at their outer ends with each of said dirigible steering means, and means associated with the inner ends of said connections for shifting said dirigible steering means, said shifting means being operatively connected with the steering means of said vehicle to be actuated concomitantly therewith and including means acting about a pair of relatively fixed pivots on the attachment frame for imparting a differential movement to said connections.

36. The combination with a vehicle having steering means, of an attachment connected therewith and comprising a frame, dirigible steering means supporting the frame at spaced points thereon, connections pivotally associated at their outer ends with each of said dirigible steering means, pivoted means connected with the inner end of each of said connections and angularly related to impart a differential movement to said connections, and means for simultaneously shifting both of said pivoted means.

37. The combination with a vehicle having steering means of an attachment connected therewith and comprising a frame, dirigible steering means supporting the frame at spaced points thereon, connections pivotally associated at their outer ends with each of said dirigible steering means, and a pair of interconnected pivoted links, the links being connected, respectively, with said connections to control the movement thereof, said links being so angularly related one to the other as to impart a differential movement to said dirigible steering means.

38. The combination with a vehicle having steering means of an attachment connected therewith and comprising a frame, dirigible steering means supporting the frame at spaced points thereon, connections pivotally associated at their outer ends with each of said dirigible steering means, a pair of links, the links being connected, respectively, with said connections to control the movement thereof, said links being so angularly related one to the other as to impart a differential movement to said connections, and means interconnecting the links and associated connections and adapted to simultaneously shift the same to differentially steer said dirigible steering means.

39. The combination with a vehicle having steering means of an attachment connected therewith and comprising a frame, dirigible steering means supporting the frame at spaced points thereon, connections pivotally associated at their outer ends with each of said dirigible steering means, a pair of swinging links connected one with each of said connections to control the extent of movement of each connection, and means connected with the inner ends of said connections to shift the dirigible steering means.

40. The combination with a vehicle having steering means of an attachment connected therewith and comprising a frame, dirigible steering means supporting the frame at opposite sides thereof, and steering devices for imparting a differential shift to said dirigible wheels, said steering devices comprising relatively shiftable members controlled by the steering of the tractor to positively hold the inside wheel in turning position against movement in one direction and for simultaneously yieldingly holding the outside wheel in turning position.

41. The combination with a tractor supported on front steering means, of a frame disposed in front of the tractor and connected therewith, dirigible wheels at opposite sides of said frame for supporting the same, and steering devices for imparting a differential shift to said dirigible wheels, said steering devices comprising relatively shiftable members controlled by the steering of the tractor to positively hold the inside wheel in turning position against movement in the direction in which the ground resistance tends to move it and for simultaneously and yieldingly holding the outside wheel in turning position.

FRANK T. COURT.